Aug. 20, 1968     J. J. COWLEY     3,398,060

PROCESS FOR CONTINUOUS REGENERATIVE DISTILLATION OF IMPURE WATER

Original Filed Feb. 19, 1965     5 Sheets-Sheet 1

*Inventor*

JOHN JAMES COWLEY by: *George A. Rolston*

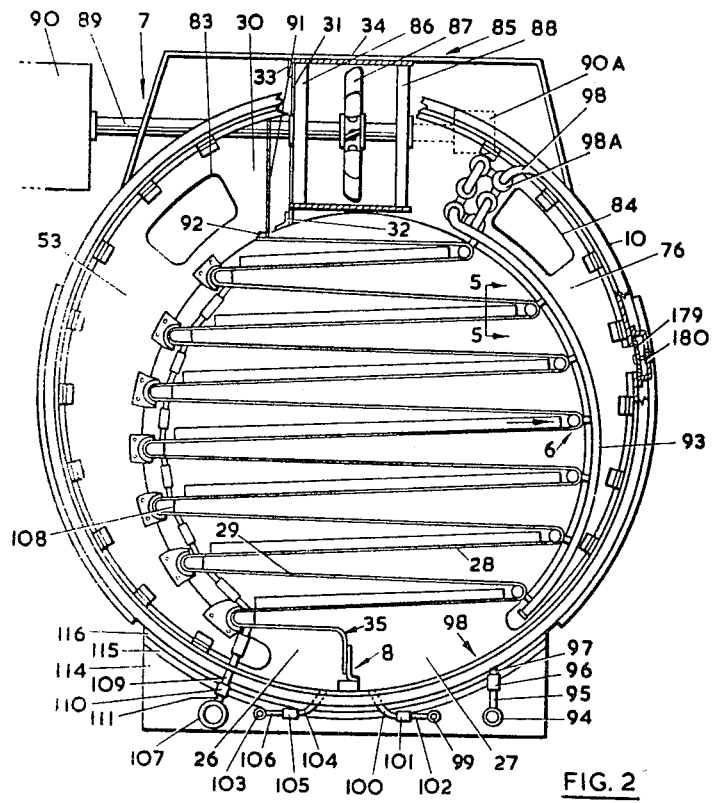
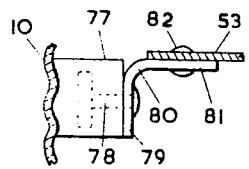
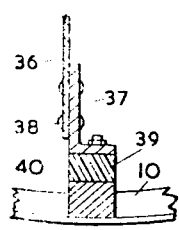
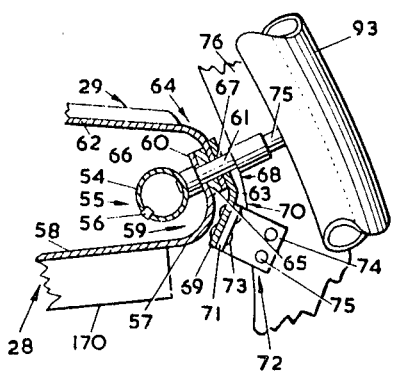
FIG. 2
FIG. 7
FIG. 8
FIG. 6
Inventor
JOHN JAMES COWLEY
by: George A. Rolston

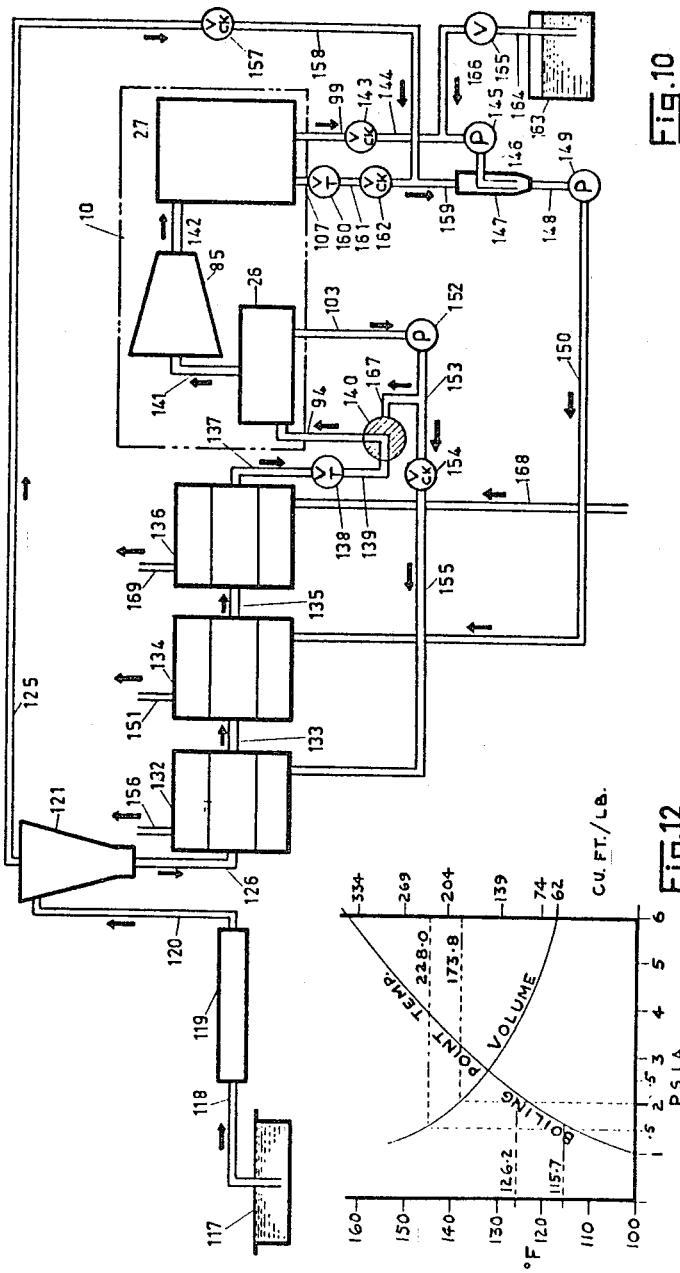

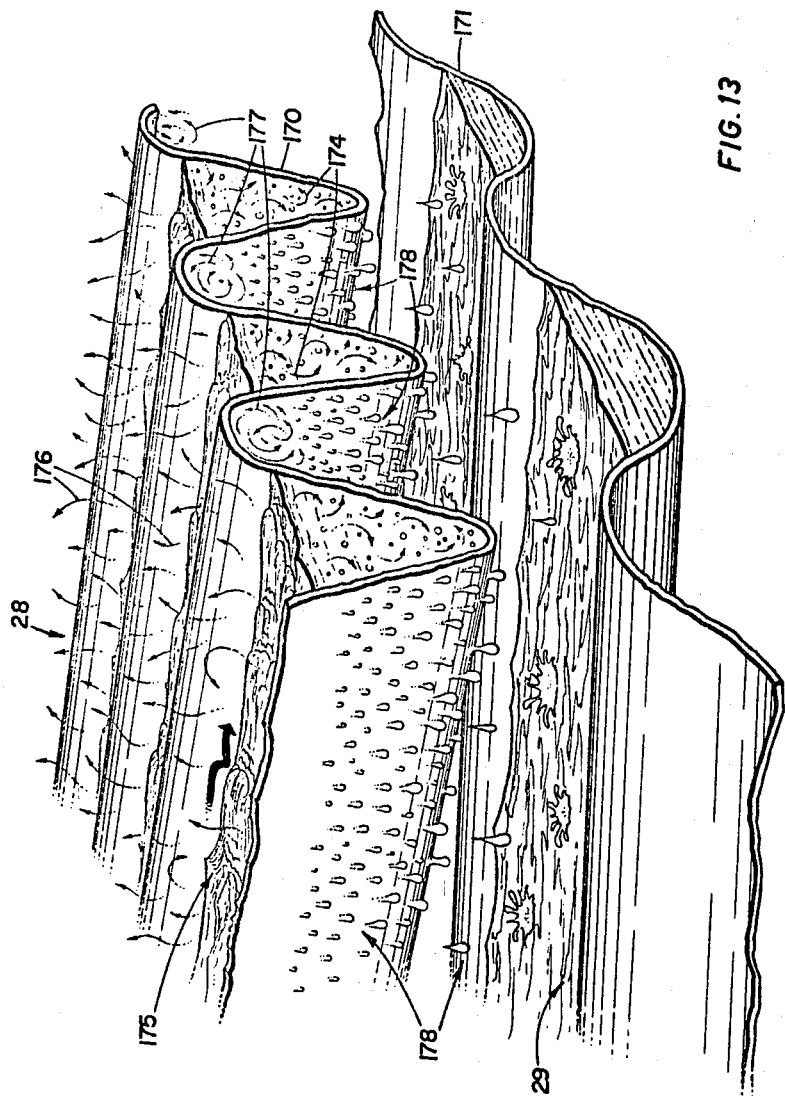

United States Patent Office 3,398,060
Patented Aug. 20, 1968

3,398,060
PROCESS FOR CONTINUOUS REGENERATIVE
DISTILLATION OF IMPURE WATER
John James Cowley, Toronto, Ontario, Canada, assignor to Desal Limited, Weston, Ontario, Canada
Continuation of application Ser. No. 434,746, Feb. 19, 1965, now Patent No. 3,305,454, dated Feb. 21, 1967. This application Feb. 10, 1967, Ser. No. 615,198
5 Claims. (Cl. 203—11)

ABSTRACT OF THE DISCLOSURE

This specification discloses a process and apparatus for regenerative distillation which is conducted at reduced pressures in a plurality of flow channels or zones of continuously expanding volume on the vapourization side and of continuously decreasing volume on the condensation side of the system and in which vapour flow is induced in predetermined directions to enhance efficiency.

This invention relates to a process for continuous regenerative distillation, and more particularly to such process for the recovery of pure water from sources that are impure and is a continuation of my application Ser. No. 434,746, filed Feb. 19, 1965 now issued to patent as U.S. Letters Patent 3,305,454 on Feb. 21, 1967, which has been assigned to the same assignee as the present application.

It is conventional practice to use distillation processes for the recovery of pure water from sea water and other impure water sources. A major disadvantage with many conventional distillation processes is that they consume large amounts of energy in relation to the quantity of fresh water produced, because the latent heat of evaporation of water is high and much of this heat is lost.

Another disadvantage with conventional apparatus for such processes is that it is high in capital cost, and it occupies a great deal of space.

One of the principal reasons for the inefficiency of prior distillation systems lies in the inefficient transfer of heat out of the water vapour and into the sea water. Such heat transfer is usually accomplished through a metallic heat exchange surface either the wall of a tube or in some cases of sheet metal. In this type of heat exchange surface it is obviously desirable to provide the largest possible surface area for contact. In addition however, the flow characteristics of water on such a surface are such that a thin, laminar barrier of water is established, which, by surface tension, is highly resistant to flow, the major volume of flow occurring a short distance away from the metallic surface. As a result the theoretical efficiency of heat transfer of the metallic tube or sheet is not achieved because the laminar water barrier must be traversed before the metal is reached, and water is a very much less efficient medium of heat transfer than metal.

This effect is further aggravated however by the fact that the laminar water barrier builds up on both sides of the metallic tube or sheet, due to the water vapour condensing on the surface thereof, thereby insulating such surface from further contact with water vapour.

The present invention seeks to overcome these particular problems generally by arranging a sheet metal heat transfer member in such a way that water flowing therealong is broken up into small volumes and flows in a circulating pattern tending to break up such laminar water barriers continuously. In addition, the reverse side of the heat transfer member is arranged to avoid bridging of individual water droplets and to avoid development of sheets of water flowing on such surface, and also by certain additional treatment reducing the stability of such droplets to ensure speedy separation thereof from such surface.

Methods other than distillation have also been utilized such as, the addition of chemicals, high frequency, osmosis, electro dialysis, freezing methods, filtering and the like, chiefly with the object of reducing the capital costs, and the operating costs, of the apparatus necessary for the recovery of pure water from impure water supplies. All of the latter methods have the disadvantage that they do not produce as pure water as does a distillation process and are in any case more expensive in operating cost.

It is an object of this invention to provide a process and apparatus for continuous regenerative distillation that is adapted to produce distilled water at relatively low capital cost and at low operating cost by using substantially all of the latent heat of vapourization contained in the vapour in a regenerative evaporating and condensing process that takes place at a relatively low temperature, and a relatively low pressure, thereby effecting the maximum economy in the utilization of the supplied energy relative to the fresh water produced.

It is another object of this invention to provide a process and apparatus having the foregoing advantages that will produce a comparatively large amount of distilled water relative to its size for portable use.

It is another object of this invention to provide a process and apparatus having the foregoing advantages that is capable of continuous production of pure water with low maintenance and servicing costs.

It is a further object of this invention to provide a process and apparatus having the foregoing advantages that is easy to start, simple to operate and adjustable in quantity of output over a relatively wide range.

It is a further object of this invention to provide a process and apparatus having the foregoing advantages that automatically and continuously removes air and other non-condensable gases that may tend to accumulate therein.

It is another object of this invention to provide a process and apparatus having the foregoing advantages that may be chemically cleaned of any scale or other organic accumulations that may tend to form, without shutting down production and without danger of contaminating the fresh water thereby.

It is a further object of this invention to provide a process and apparatus having the foregoing advantages that is adapted to provide adjustable control of the degree of concentration of the brine or residue liquid that is extracted.

It is a further object to provide a process and apparatus having the foregoing advantages in which the transfer of heat therein is maintained at a high degree of efficiency at all times during operation by inhibiting development of laminar water barriers on the heat exchange surfaces.

It is a further objective of the invention to provide a process and apparatus having the foregoing advantages wherein movement of the large volumes of water vapour developed is effected at relatively low pressures and within a single unit or chamber thereby avoiding the use of costly ducting.

The foregoing and other objectives will become apparent from the following description of a preferred embodiment of the invention which is given here by way of example only with reference to the following drawings in which like references refer to like parts thereof throughout the various views and diagrams, and in which:

FIGURE 2 is an end elevational view from the direction of arrow 2 of FIGURE 1 with end cover removed;

FIGURE 6 is an enlarged fragmentary view, partly in section, taken at the location indicated by the arrow 6 of FIGURE 2, showing a method of introducing the impure water to the upper end of the evaporator tray and also a method of sealing between the junctions of the extensions of the transition pieces connecting to the evaporator trays and pure water draining tray respectively;

FIGURE 7 is a rotated sectional view taken of the location indicated by arrow 7 in FIGURE 2, showing means for attaching a support plate to the inside surface of the outer casing;

FIGURE 8 is an enlarged fragmentary detailed view taken at the location indicated by arrow 8 of FIGURE 2 and showing a means of connection between the lower evaporator tray and the bottom interior wall of the outer casing;

FIGURE 10 is a schematic view illustrating the process of recovering pure water from impure water as embodied in this invention;

FIGURE 12 is a graph showing the relationship of water temperature in degrees Fahrenheit and water vapour pressure in pounds per square inch absolute to the vapour voume in cubic feet per pound and to the boiling point temperature of the water; and, FIGURE 13 is an isometric view of a pair of evaporator and drain trays cut away along their length and showing an impression of the action of the impure water, water vapour, and pure water respectively during operation of the process.

The process according to the invention is conducted substantially in the following manner. A closed and sealed vessel divided by a phase separation barrier into vapourization and condensation chambers is evacuated to a high vacuum by continuous evacuation from the condensation chamber. Impure liquid such as salt water is admitted into the vapourization chamber and is passed along a large number of separate flow paths defined by a heat exchange surface by gravity flow preferably by tilting of the flow path slightly below the horizontal thereby inducing continuous agitating and tumbing action of the liquid and maintaining such heat exchange surface free of the so-called "vapour" or, laminar water barrier, which otherwise tends to inhibit free flow of heat therefrom, and as a result the water or other liquid present is wholly or partly vapourized. The water vapour so developed is transferred from said flow paths within said vessel along a continually widening vapour path and around the phase separation barrier into the condensation chamber at increased pressure such transfer being continuous and sufficient to maintain a pressure difference between the chambers which is significant in relation to the vacuum developed and is effective to ensure condensation therein. The water vapour thus transferred into the condensation chamber is passed along a continually narrowing vapour path in contact with a heat exchange surface whereat condensation into droplets takes pace. Water vapour and impurities such as air remaining after such passage are continuously evacuated from the point of minimum volume of such flow path to ensure continuous flow therealong and to maintain the desired vacuum. Water droplets forming at the condensation surface drop freely therefrom under the influence of gravity without merging into a liquid flow on such surface the condensation heat exchange surface being tilted slightly below the horizontal along the axis of flow whereby to prevent liquid lying thereon to drain off by flow but to fall freely therefrom as they increase in size beyond the capacity of the surface tension of such liquid to support them. Separation of such droplets is accelerated by applying cyclical shocks to the water vapour in the condensation chamber and by surface treatment of the heat exchange surface, for example, with a silicone based coating.

Figure 9:
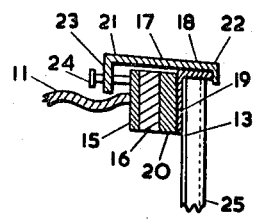
FIGURE 9 is a fragmentary sectional view taken on the line 9—9 of FIGURE 1 and showing the connecting means, and the sealing means between the end portion of the cylindrical portion of the outer casing.
Figure 1:
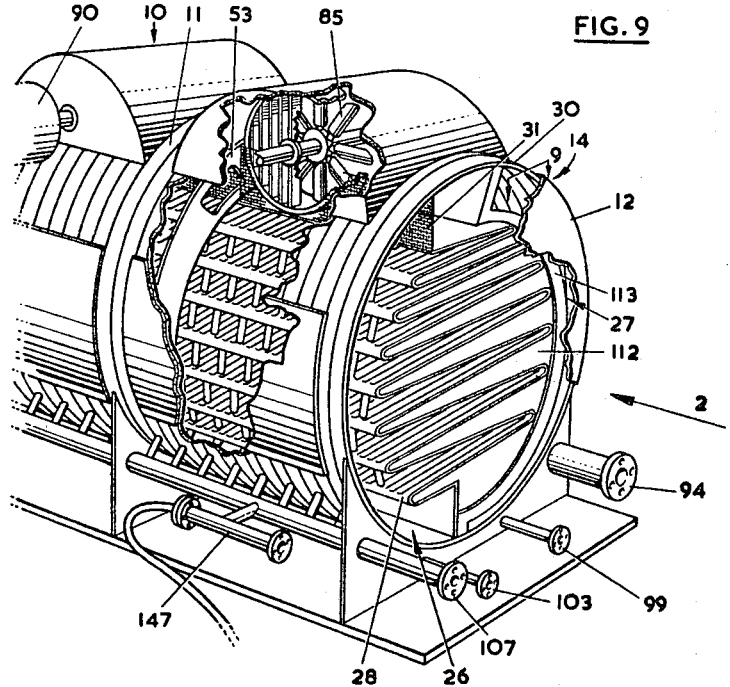
FIGURE 1 is a perspective part cut-away view, showing a preferred form of regenerative still, embodying this invention.

A form of apparatus suitable for carrying out the aforesaid process is now described and, referring to FIGURE 1, will be seen to comprise a cylindrically shaped vessel 10, comprising a cylindrical casing 11 attached to end 12 preferably by welding around the periphery of end 12, and adapted to be removably attached to end 13 as shown in FIGURE 9. Referring to FIGURE 9 the end of tubular casing 11 at 14 abuts onto and is preferably welded to a circularly formed flange piece 15. To the outer face of flange 15 is bonded by conventiona means a flat circularly formed sealing ring 16 made from suitable, pliable material such as neoprene. The end 13 is attached at its outer edge to circularly formed strip 17 of angle material preferably by welding, one lip 18 of strip 17 being parallel to casing side 11 and the other lip 19, of angle strip 18, being parallel to the face of flange 15. A flat circularly formed sealing ring 20 is bonded to the inner face of lip 19. A clamping band 21 provided with circumferential tensioning means, is adapted to circumferentially enclose, and to draw into axial alignment the casing 11 and end 13. An inwardly directed lip 22 is formed on the outer edge of clamping band 21 while on the inner edge thereof a similar but larger inwardly directed lip 23 is formed which contains a plurality of regulary spaced threaded holes around the periphery thereof, adapted to threadably receive threaded studs 24. The end 13 may be made rigid by means of a plurality of corrugations 25, preferably running in the vertical direction.

Referring to FIGURES 1 and 2 the volume contained by the vessel 10 is divided into an evaporator chamber or section 26 and a condenser chamber or section 27 by means of evaporator trays 28, and pure water drain trays 29, joined together at their adjacent edges to constitute a continuous zigzag phase separation barrier within the vessel 10. It will be noted that evaporator trays 28 and drain trays 29 overlie one another in a sandwich like formation and are preferably angled or tilted slightly below the horizontal by between about 3 degrees and 20 degrees to ensure flow of liquid therealong into their respective evaporator and condenser chambers 26 and 27 although in fact evaporation trays 28 can in some cases actually lie horizontally and preferably have less tilt than drain trays 29. Trays 28 and 29 run in a longitudinal direction for the length of the vessel 10, and of a width required to form an envelope describing the space occupied by the group of trays which is substantially cylindrical in shape, and substantially smaller in diameter than the diameter of cylindrical vessel 10, having its axis parallel thereto but displaced downwardly therefrom, so that a space 30 in the form of an eclipsed circle is left between the top of the group of trays and the top of vessel 10. In this space 30 a longitudinally directed, vertically disposed, panel 31 is located, having its lower edge attached to bracket 32, which is located centrally of, and is attached to the top of the uppermost drain tray 29, and runs longitudinally for the length of the tray. The panel 31 is upwardly directed with a slant toward the condenser chamber 27, its upper edge being attached to a bracket 33, running longitudinally for the length of the vessel 10 and being attached by bonding means to a relatively thick strip of resilient material 34 which in turn is attached to the inside surface of the outer casing 11 preferably by bonding. The lower-most pure water drain tray 29 is folded downward at 35 to form a downwardly directed, longitudinally disposed panel portion 36 which is attached to angle bracket 37 by means of fasteners such as rivets 38. To the lower horizontal face of angle bracket 37 is bonded a strip 39 of suitable resilient material such as neoprene, while a strip 40 of similar material is bonded to the bottom inside surface of casing 11, running longitudinally for the length thereof.

It will be noted that the construction of evaporator trays 28 and drain trays 29 differ from one another in various respects. Thus evaporator trays 28 are formed of material having a high conductivity of heat and are shaped into parallel narrow V-shaped channels 170 having relatively steep side walls in which water flowing therealong will be subjected to a continuous agitating and tumbling action due to gravitational forces. Preferably the dimensions of such V-shaped channels 170 are related to flow characteristics of the liquid, which, if sea water, may permit a channel width of as little as 1/16 of an inch, and in any case is such that the space therebetween is not sufficient to permit a laminar barrier to develop on both sides of the channel. The illustration in FIGURE 13 illustrates the nature of such flow schematically with the channels 170 widened out of proportion for the sake of clarity. At the same time a large surface area for heat exchange purposes is achieved in a relatively small space. Drain trays 29 are formed of similar material but are shaped into parallel U-shaped corrugations to permit relatively rapid run off of pure water while restraining sideways flow.

The relative location of trays 28 and 29 in overlying relation and angled to procure gravitational flow of water therealong is also of significance in that it provides and defines alternate evaporator zones 172 and condensation zones 173 which are characterized by a continuously enlarging and decreasing volume respectively along the flow path of water vapour passing therealong. In this way pressure difference along such flow path are minimized and increased efficiency is achieved.

Figure 3:
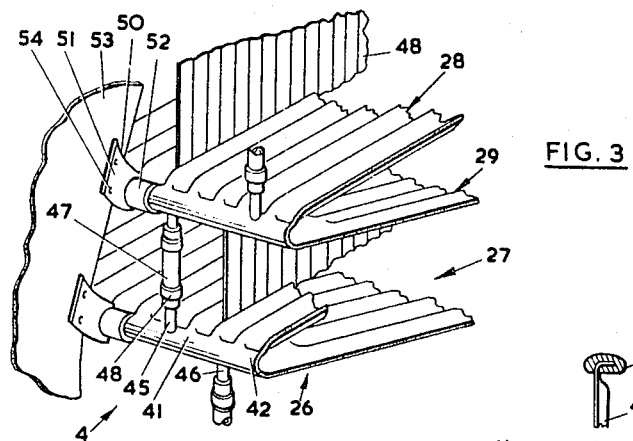
FIGURE 3 is a fragmentary perspective view showing an enlarged detail of the evaporator trays and the associated parts and connections thereto, located as indicated by arrow 3 in FIGURE 1.
Figure 4:
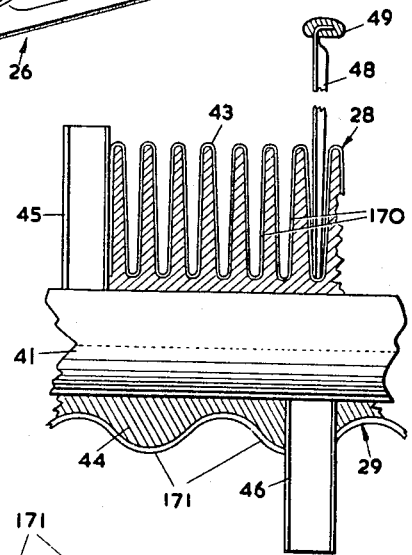
FIGURE 4 is a view taken in the direction of arrow 4 in FIGURE 3 showing folded transition piece and the connection thereto of the tubes, of the evaporator tray and the pure water drain tray.

Referring to FIGURE 3, transition piece 41 consists of suitable sheet material folded through substantially 180 degrees to form a tubular shaped outer facing portion 42, the lower edge portion of which is attached to the pure water drain tray 29 while the upper edge portion is attached to the evaporator tray 28, the attachment means suggested being shown in FIGURE 4. It will be noted that the reverse or underside of channels 170 of evaporator trays 28 thereby constitute vapor condensation heat exchange surfaces of contour and shaping corresponding to V-shaped channels 170 and defining reverse or inverted V-shaped surfaces, the angling or inclination of which will correspond to that of channels 170. However, the spacing may preferably be somewhat greater to inhibit bridging of droplets and to ensure free separation of droplets therefrom. Such inverted V-shaped surfaces, indicated as 170a, are preferably coated to reduce surface tension of liquids forming thereon a silicone based coating being particularly suitable for the purpose.

In FIGURE 4 an attachment medium 43 consists of a strip of suitable resilient material such as for instance neoprene pre-molded to fit the corrugations of tray 28 and bonded by conventional means thereto. The lower side of the material 43 is flat, to match the upper edge portion of transition piece 41 to which it is bonded. A lower strip 44 of similar material is formed to fit the corrugations of the pure water drain tray 29, to which it is bonded, and likewise strip 44 is bonded to the lower edge portion of transition piece 41. Projecting from transition piece 41 at suitably spaced intervals along the horizontal lengths are a plurality of upwardly projecting tubes 45, and a similar series of downwardly projecting tubes 46. These tubes are preferably attached by welding and communicate with the space formed between the lower surface of evaporator trays 28 and the upper surface of the pure water drain trays 29, for evacuation of surplus water vapour and air in a manner to be described below.

The tubes 45 and 46 are positioned and directed so as to be in axial alignment with each other between each of the tiers of transition pieces 41, and are interconnected by insertion into opposite ends of suitably cut lengths of flexible tubing 47, each end of flexible tubing 47 being enclosed by suitable clamping means such as conventional hose clamps. Wedge shaped spaced pieces 48 which are preferably vertical corrugated are placed at regular intervals between the upper surface of evaporator tray 28 and the lower surface of the pure water drain tray 29, and are secured therein by adhesive means 49, applied between the upper side of spacer 48 and the lower surface of drain tray 29. Support brackets 50 comprising a vertical flange member 51 and a horizontally disposed semitubular segment 52 adapted to fit to the external face 42 of the transition piece 41, and to be attached thereto by suitable means such as bonding or welding. Flange piece 51 of the bracket 50 is attached to support plate 53 by suitable fasteners such as bolts 54.

Figure 5:
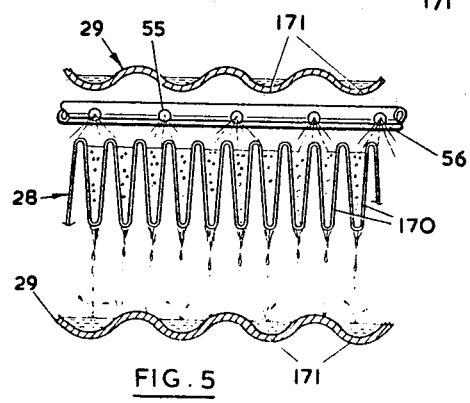
FIGURE 5 is a fragmentary sectional view taken on the line 5—5 of FIGURE 2 showing the physical reation of the impure water on the evaporator side to the pressurized pure water vapour on the condenser side.

Referring to FIGURE 5, a pipe 54, running longitudinally, and parallel with the axis of vessel 10, is located internally of the apex formed by the junction of the evaporator tray 28 with the upper adjacent drain tray 29, contains on its inwardly facing side 55, a plurality of regularly, and suitably spaced nozzles 56 arranged in one or more horizontally aligned rows, and from which impure water may flow under the influence of a differential pressure onto evaporator trays 28.

Referring to FIGURE 6, transition piece 57 is made from a strip of suitable sheet material and runs the full length of the evaporator tray 28 and may be attached thereto by means of an interposed strip of pre-formed resilient material at 58 in the same way as was described for attaching transition piece 41 to the other end of evaporator tray 28. The end portion of transition piece 57 contains a longitudinal bend at 59 so that its upper end portion 60 is perpendicular to connecting pipe 61. Transition piece 62 is made from a strip of material similar to that used for 57 and is attached to drain tray 29 by similar means, portion 63 being downwardly directed by a longitudinal bend at 64. A sealing strip 65 of resilient material such as neoprene is interposed between the end portion 60 of transition piece 57 and end portion 63 of transition piece 62. A backing and spacer strip of material 66 is attached to pipe 54 preferably by welding and runs the full length of trays 28 and 29 respectively. One lip 67 of an upper stiffening strip 68 lies adjacent to end portion 63, of transition piece 62 and runs longitudinally for the full length of drain tray 29 while the other lip 69 is free and directed downward from a longitudinal bend 70. Clamping means such as a plurality of threaded studs not shown may be used to draw stiffening strip 68 toward backing strip 66. One lip 71 of right angle bracket 72 is fastened by conventional fasteners such as rivets 73 to the outer face of lip 69 of backing strip 68 while lip 74 of angle bracket 72 is vertically oriented and radially directed containing one or more holes 75 therein, adapted to receive fasteners for the securing thereof to support plate 76.

Support plates 53 and 76 are located in the evaporator chamber on section 26 and the condenser chamber on section 27 respectively, and are adapted to fit inside of and closely adjacent to the inside surface of the tubular casing 11 in a plane perpendicular thereto.

Referring to FIGURE 7 a suggested means for securing of support plates 53 and 76 respectively to the inner wall of tubular casing 11 is shown whereby 77 may be a suitable block of resilient material such as neoprene, having its outer side shaped to conform to the inner surface of tubular casing 11, and bonded by conventional means thereto. A plurality of fastening devices 78, may be anchored by imbedding internally of 77, for the purpose of securing lip 79 of angle bracket 80 thereto. Lip 81 is adapted to project radially and to lie adjacent to the face of either support plate 53 or support plate 76 to which it may be secured by means of a plurality of fastening devices such as rivets 82.

Cut-outs 83 and 84 located in support plates 53 and 76 respectively are of sufficient size for the purpose of inspection or maintenance work. The openings 83 and 84 may be dispensed with if a sufficient number of removably attached covers (not shown) were provided through the outer casing 11.

An axial gas compressor unit 85 is attached by conventional means, (not shown) to panel 31 and comprises an inlet set of stator blades 86, a set of rotary blades 87, an outlet set of stator blades 88, a rotar and shaft assembly 89 and a prime mover 90 located outside vessel 10. The prime mover 90 may be an electric motor, or alternatively, may be a steam turbine 90A as shown in phantom.

A diffuser screen 91 is attached to a bracket 92 which is located centrally of and attached to the top of the uppermost drain tray 29 by suitable conventional means (not shown), and running longitudinally for the full length thereof. The upper edge of the diffuser screen 91 is held close to the inner surface of casing 11 throughout its length by conventional support means not shown.

One or more pipes 93, upwardly directed and curved to maintain proximity to spray pipes 56, communicate with the impure water supply pipe 94. Upon a vacuum being drawn internally of the vessel 10 water may flow from pipe 94 through pipe 95, through flexible hose connection 96, through pipe 97 which passes through and is preferably weldably attached to the wall of casing 11, then upwardly through pipe 98 to pipe 93, through one of the connecting pipes 75, to flexible hose connection 76, then through pipe 61 into pipe 54, from where it may flow from the spray nozzles 56 into the evaporator trays 28.

Pure water removal pipe 99 communicates with the condenser side 27 internally of vessel 10, and permits the pure water to flow, upon a pressure reduction induced by pumping or other means at the outer end of pipe 99, into pipe 100 which passes through the wall of casing 11 at the bottom thereof and is preferably welded thereto, then into flexible hose 101 to pipe 102 to pipe 99.

A residue removal pipe 103 communicates with the evaporator side 26 internally of vessel 10 and allows a liquid residue or brine to flow into one or more pipes 104 which pass through the wall of casing 11 at the bottom thereof, and are preferably welded thereto, then into flexible hose 105 to pipe 106 and thence into pipe 103.

An air and vapour removal pipe 107 communicates with the condenser chamber 27, internally of vessel 10 in the apexes formed where the lower side of the evaporator trays 28 meet the upper side of pure water drain trays 29 at the transition piece 41, where, upon a sufficiently low pressure being applied to pipe 107, the vapour or gas contained between evaporator trays 28 and the pure water drain trays 29 may flow through baffle screens 108 consisting of heavy close mesh screening placed vertically across the front of transition piece 41 and running longitudinally for the length of the tray, being attached therein by suitable conventional means (not shown), from where the gas may flow downward through successive tiers of transition pieces 41, through 45, 47, 46 respectively between each tier, to tubes 109 which pass through the wall of casing 11, and are preferably weldably attached thereto, then to hose connections 110, to connecting pipes 111, into pipe 107. The air removal pipe 107 runs parallel to the axis of casing 11 and adjacent to the lower, outer side thereof, and carries a plurality of regularly spaced aligned connecting pipes 111 for which there are a similar number of associated pipes 110 and 109, attached thereto.

Referring to FIGURE 1 the number of interconecting tube assemblies comprising tubes 46, 47 and 45 respectively, are progressively decreased with each ascending tier of tray assemblies comprising an evaporator tray 28, a drain tray 29, and a transition piece 41. At each extreme end of the tray assemblies the space between the lower side of evaporator tray 29 and the drain tray 28 is closed by vertically disposed end pieces 112 which are each of a size and shape to fit the opening, being attached by suitable conventional means such as bonding or welding.

A strip of relatively thick resilient material constituting a seal 113 runs from the upper edge of panel 31 downwardly to the upper drain tray 29 thence in a circular downward direction over the extremities of the tray assemblies on the condenser side 27, to angle strip 37 from where it turns vertically downward to meet the inner surface of the bottom of vessel 10. Sealing strip 113 is adapted to meet and abut onto a similarly shaped sealing strip not shown, bonded to end 13 so that upon the end 13 being clamped into place onto casing 11 the condenser side 27 is sealed from the evaporator side 26, except for the passageway through the compressor units 85.

The mass of the structure contained in vessel 10 is supported on a plurality of vertically disposed flat plate sections 114, one being placed under the lower side of vessel 10 at each end, and one under each of the locations wherein the support plate sections 53 and 56 are located internally of the vessel 10. Support piece 114 is rectangular on its bottom and of concave circular form to fit the outer surface of cylindrical vessel 10, on its top end and having attached as by welding on its curved upper side a flat strip 115 of material similarly curved and located centrally of its width thereof. On the upper surface of strip 115 a relatively thick flat strip 116 of resilient material such as neoprene is bonded, the upper face of 116 being bonded to the outer surface of vessel 10.

Referring to FIGURE 10, impure water may be drawn from source 117 through pipe 118 to filter unit 119 where most of the foreign particles are screened out, then through pipe 120 to the air removal unit 121 which is located about 10 feet to 15 feet in elevation above the centre of vessel 10 so that the water at this location is subjected to a vacuum tension, where it is made to flow in thin laminar layers, so that the greater portion of the entrapped air is given off.

Figure 11:
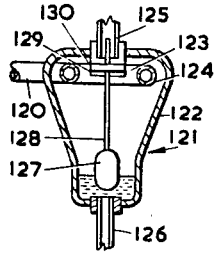
FIGURE 11 is a cross section of apparatus that may be located as shown by arrow 11 of FIGURE 10, to be used as a means for removing the greater portion of the dissolved and suspended gasses contained in the incoming impure water.

Referring to FIGURE 11, an air removal unit 121 comprising a funnel shaped vessel having upwardly divergent sides, 122 of circular section, and containing internally at its upper end, a circular manifold, horizontally disposed and in communication with pipe 120, so that upon a vacuum being drawn internally of 121 through pipe 125, impure water may flow out of jets 124 onto, and down the wall 122 in thin layers. The design is such that the inflow of impure water is greater than the outflow through pipe 126 so that water will rise internally in the vessel 121 until a float 127 is lifted, raising the stem 128 having concentrically attached to its upper end a disc 129, to the upper side of which is attached a pad of soft resilient material 130, which is adapted to shut off the vacuum from pipe 125, thus preventing further inflow of impure water through pipe 120 until such time as the float settles due to the outflow of impure water through pipe 126. From pipe 126 the impure water may flow through a series of auxiliaries comprising, heat exchanger 132, pipe 133, heat exchanger 134, pipe 135, heat exchanger 136, pipe 137, to throttle valve 138 through pipe 139, then through switching valve 140 through pipe 94 and into the evaporator chamber 26. Pipe 98 is preferably arranged to extend to and fro along the length of vessel 10 within the condenser chamber 27 and is provided with fins 98A for further preheating the incoming sea water.

The pure water is drawn off from the condenser chamber 27 through pipe 99, through check valve 143, through pipe 144 to pump 145, which forces it through pipe 146 to ejector 147, through pipe 148, to pump 149, through pipe 150 to heat exchange 134, and through pipe 151 to storage which is not shown.

The residue liquid or brine is drawn out of evaporation chamber 26 through pipe 103 to pump 152 which forces it through pipe 153, to check valve 154, through pipe 155 to heat exchanger 132, through pipe 156 to waste drainage or to further processing (not shown).

The air from the air remover 121, is drawn off through pipe 125 to check valve 157, through pipe 158 to pipe 159, to ejector 147, from where it is carried out with the pure water.

Air and excess water vapour is drawn off from the condenser chamber 27 through pipe 107 to throttle valve 160, through pipe 161 to check valve 162, through pipe 159 to extractor or ejector 147 from where it flows out with the pure water.

A pure water supply 163 is connected by pipe 164 to valve 165, through pipe 166 to pipe 144, from where it connects to the pump 145. From pipe 153 pipe 167 connects to switch valve 140.

Condenser chamber 27 is preferably provided with shock excitation means comprising diaphragm 179 cyclically operated by electrical vibrator means 180 attached to the wall of vessel 10.

The operation of the system is as follows: To start operating, the porting of switch valve 140 is set so that pipe 167 connects to pipe 94. Valve 165 is opened and pumps 145 and 149 are started, whereby water is forced through the ejector 147, to draw air from the interior or vessel 10 through pipe 107 and through the series of connecting pipes and components to ejector 147, from where it is forced out with the water through pipe 150. Pump 149 reduces the pressure to a quite low value in pipe 148 so that pump 145 serves only to create sufficient water pressure in pipe 146 to insure the efficient operation of the ejector 147. Air cannot flow from pipe 158 because the initial rise of water in the air remover 121 causes the float to rise and shut the entrance to pipe 125 off. When the pressure in vessel 10 has been reduced to the level to where the temperature of the water in pipe 137 as plotted on the graph of FIGURE 12 intersects with the pressure ordinate at a point above the boiling point temperature curve then water is admitted into the evaporator chamber 26 by switching valve 140 to connect pipe 139 with pipe 94, and the compressors 85 are started. Impure water will then flow through pipe 94 to pipe 93 and thence be admitted to evaporator chamber 26 through pipes 54 and jets 56. Water flowing from jets 56 will enter channels 170 formed in evaporator trays 28 and flow downwardly therealong under gravitational force in contact with the heat exchange surface constituted by evaporator trays 28 and heat will pass therefrom and vapourize at least part of the water flowing as aforesaid. By reason of the shape of channels 170 and the flow of water therealong such water is continuously agitated and tumbled over on itself and provides a scrubbing action along the sidewalls of channels 170 substantially as shown by arrows 174 and wave formations or ripples 175. Such scrubbing action is effective to eliminate or substantially reduce the "vapour barrier" which would otherwise be built up over the surface of evaporator trays 28 and which is at least partially responsible for substantial losses in efficiency of heat transfer into water flow thereover.

Water vapour developed from evaporator trays 28 will rise therefrom as generally indicated by arrows at 176 and will be immediately drawn along the path defined by respective evaporator trays 28 and drain trays 29 and trasnferred from evaporator chamber 26 into condenser chamber 27 by the compressors 85 and raised in pressure so that the intersection of the vapour pressure ordinate on graph 12 falls below the boiling point temperature curve and condensation takes place. By reason of the continuous evacuation of air and water vapour from condenser chamber 27 through pipe 107 as aforesaid water vapour therein will be drawn between the spaces defined by respective drain trays 29 and evaporator trays 28 along a path of condensation. Water vapour passing therealong will contact the reverse or underside surfaces of evaporator trays 28 substantially as indicated by arrows 177 and will lose heat thereto and thus be condensed into water droplets. Such droplets, generally indicated by reference 178 will fall from evaporator trays 28 and be collected on drain trays 29 thus maintaining evaporator trays 28 substantially clear of liquid water and in effective contact with water vapour for the purposes of providing a heat exchange surface, the latent heat of vapourization passing from the condensing chamber 27 through the evaporator trays 28 to the liquid in the evaporating chamber 26 where it services to produce approximately an equal amount of vapour. Condensed water will flow off drain trays 29 and accumulate in the bottom of condensation chamber 27 from whence it is drawn off through pipe 99 for use or storage. The efficiency of condensation will be low for a short time after start up due to the presence of air, but as this is gradually drawn off through pipe 107, full efficiency and volume of pure water production will be attained. In cold weather or in cold climates the temperature of the water fed into the regenerative still should be increased by supplying heat to heat exchanger 136 by flowing of heated liquid or gas in through pipe 168 and out through pipe 169, the operation of which has been described above. Waste heat, also may be supplied to heat exchanger 136 to increase the pure water output of the system. As much as possible of the heat contained in the outflowing liquids is returned to the system through heat exchangers 132 and 134, the operation of which has been described above. Since the brine is slightly cooler than the pure water its heat is added to the incoming water first, at heat exchanger 132, and the heat from the pure outflowing water is then added at heat exchanger 134. The stippled lines on the graph of FIGURE 12 show a contemplated efficient operating set of conditions for the system, whereby the evaporator will be operated at a pressure 1.5 lbs per square inch absolute, the corresponding boiling point temperature would be 115.70° Fahrenheit and the volume of vapour per lb. would be 228 cubic feet, while the condenser would operate at 2 lbs per square inch absolute with the corresponding boiling temperature of 126.2° Fahrenheit and a vapour volume of 173.8 cubic feet per lb.

The system tends to be self regulating, in that if the temperature of the incoming water is high or the weather is hot the temperature and the pressure of the process will increase and the pure water production will go up, but the heat losses from the system will also go up, because of the increased convection and radiation losses, and the increased heat loss from the outgoing pure water, so that a balance point is reached. Pure water production will also bear a direct relationship to the amount of power supplied to the compressors 85, thus permitting a wide range of control to be exercised over the production of the system.

The brine concentration can be varied to a certain extent by adjusting the inflow control valve 138.

To attain any desired degree of brine concentration, the switch valve 140 may be alternately switched by automatic means so as to shut off the incoming water and return the outgoing brine back into the input pipe 94, for periods of time which can be varied, so that a switching cycle that dwells on the brine recirculation for long periods and on the incoming water for short periods will result in highly concentrated brine.

The apparatus just described is capable of many variations in design without varying the process or departing from the concept of the invention. The vapour pump described in the text, for instance, is of the axial compressor type, similar to those used in aircraft engines, and has the advantage of being very high in mechanical efficiency, but it may however in some cases be more advantageous to use a steam ejector type of vapour pump, especially in cold climates where additional heat input is required.

The scope of the apparatus may also be increased by incorporating means for the purpose of separating and collecting the heavy water or deuterium, such means consisting of a centrifuge used in conjunction with or in the place of an axial compressor unit 85, the heavy water being removed by separate piping (not shown).

Another variation is to use a series of units connected in an end to end tandem series of sections each section being sealed from the other, the impure water being made to flow from stage to stage, the temperature and pressure being reduced at each successive stage. Such arrangement would be more costly but may result in a worthwhile saving in operating cost.

The process and apparatus embodied in this invention have been discussed in relation to the water purification application. It may however be adapted to many other industrial processes where efficiency and economy are desired, such as for instance the petroleum and chemical industries.

While reference has been principally to processing of impure water such as sea water the invention is also applicable to the processing of waste water carrying industrial or domestic impurities. In any event, however, the design of evaporator trays 28 and channels 170 will be such that the height of the sides of the channels and the inclination thereof as such are insufficient to support by surface tension a laminar film of such liquid, and in particular that such inclination is at angle greater than the critical angle at which such surface tension is broken.

The foregoing is a description of a preferred embodiment of the invention which is here made by way of example only. The invention is not to be construed as limited to any of the specific features described but comprehends all such variations as come within the spirit and scope of the appended claims.

What I claim is:

1. A process for continuous regenerative distillation of impure liquids such as impure water and the like and comprising the steps of;

withdrawing impure liquid from a source;

introducing said impure liquid into a plurality of vertically layered liquid flow paths angled slightly to the horizontal and thereby inducing gravitational flow in a predetermined direction corresponding to a plurality of vapour flow paths of continuously expanding volume within an evacuated vapourization chamber at a predetermined reduced pressure;

said impure liquid being introduced into said vapourization chamber flow paths at spaced points along approximate apexes of said vapour flow paths at a temperature just below the boiling point of said liquid at said pressure;

flowing said impure liquid along said flow paths in substantially the same direction as vapour flowing therein and in contact with heat exchange surfaces thereby raising its temperature and boiling same to generate vapour;

upwardly removing vapour from said flow paths into said vapourization chamber;

downwardly removing surplus impure liquid from said vapour flow paths in said vapourization chamber in countercurrent flow to said vapour escaping therefrom;

continuously compressing and transferring said vapour from said vapourization chamber to a condensation chamber, thereby establishing a pressure differential between said vapourization chamber and said condensation chamber;

continuously force-flowing said vapour along vapour flow paths in said condensation chamber of continuously reducing volume in contact with the opposite, under surfaces of said heat exchange surfaces thereby lowering its temperature and condensing same into pure liquid;

continuously removing said condensed pure liquid from said heat exchange surfaces and collecting same and flowing same along said flow paths in countercurrent flow to said vapour, and continuously evacuating said condensation chamber, and thereby evacuating said vessel, from spaced points located at the apexes of said condensation chamber vapour flow paths whereby to maintain continuous forced vapour flow there along as aforesaid.

2. The process as claimed in claim 1, including the step of transferring heat from said pure liquid to said liquid prior to introduction thereof into said vapourization chamber for preheating thereof.

3. The process as claimed in claim 1, including the step of recycling said surplus vapour with said condensed liquid for condensation thereof.

4. The process as claimed in claim 1, including the step of applying cyclical shocks to said vapour in said condensation chamber.

5. The process as claimed in claim 1, including the step of passing said impure liquid through said condensation chamber prior to introduction to said vapourization zone.

References Cited

UNITED STATES PATENTS

| | | | |
|---|---|---|---|
| 2,619,453 | 11/1952 | Anderson | 203—4 X |
| 2,759,882 | 8/1956 | Worthen et al. | 203—11 |
| 2,894,879 | 7/1959 | Hickman | 203—27 |
| 2,899,366 | 8/1959 | Hickman | 202—205 |
| 3,175,962 | 3/1965 | Holkslag | 202—236 |
| 3,200,050 | 8/1965 | Hogan et al. | 202—176 |
| 3,298,932 | 1/1967 | Bauer | 203—11 |
| 3,305,454 | 2/1967 | Cowley | 203—26 X |

FOREIGN PATENTS

| | | |
|---|---|---|
| 205,057 | 3/1955 | Australia. |
| K 24,930 | 12/1956 | Germany. |

NORMAN YUDKOFF, *Primary Examiner.*

F. DRUMMOND, *Assistant Examiner.*